(12) United States Patent
Shin-e

(10) Patent No.: US 7,676,010 B2
(45) Date of Patent: Mar. 9, 2010

(54) SYNCHRONIZATION SIGNAL DETECTOR, INFORMATION RECORDING/REPRODUCING APPARATUS, AND SYNCHRONIZATION SIGNAL DETECTING METHOD

(75) Inventor: Hiroyuki Shin-e, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1110 days.

(21) Appl. No.: 11/086,764

(22) Filed: Mar. 23, 2005

(65) Prior Publication Data

US 2005/0213695 A1    Sep. 29, 2005

(30) Foreign Application Priority Data

Mar. 25, 2004    (JP)    ............... 2004-089433

(51) Int. Cl.
  *H04L 7/00*    (2006.01)
(52) U.S. Cl. ..................................... 375/354
(58) Field of Classification Search ................ 375/354, 375/355, 356, 359, 360, 365, 368; 348/500
See application file for complete search history.

(56) References Cited

U.S. PATENT DOCUMENTS 5,986,986 A * 11/1999 Todo et al. ................ 369/47.1
6,222,400 B1    4/2001 Fukuda et al.

FOREIGN PATENT DOCUMENTS

| CN | 1405759 | 3/2003 |
|---|---|---|
| JP | 10-112133 (A) | 4/1998 |
| JP | 10-199162 | 7/1998 |
| JP | 2000-3550 | 1/2000 |
| JP | 2000-003550 (A) | 1/2000 |
| KR | 1999-021762 | 3/1999 |
| KR | 10-0389730 | 6/2003 |

OTHER PUBLICATIONS

Korean Office Action dated Jun. 30, 2006 with Partial English Translation.
Chinese Office Action dated Dec. 7, 2007, with partial English and Japanese translation.
Japanese Office Action dated Jun. 16, 2009 with Partial English Translation.
Japanese Office Action dated Feb. 4, 2009 with Partial English Translation.

* cited by examiner

*Primary Examiner*—Jean B Corrielus
(74) *Attorney, Agent, or Firm*—McGinn IP Law Group, PLLC

(57) ABSTRACT

Disclosed is a synchronization signal detecting apparatus that includes a window generating circuit for generating a synchronization detecting window, a re-synchronization window generating circuit for generating a re-synchronization window, and a synchronization detecting circuit for generating a re-synchronization detecting window of a time interval that excludes a re-synchronization window mask from the re-synchronization window, detecting a synchronization signal from an input bit stream and detecting the synchronization signal in the re-synchronization detecting window. If the synchronization signal is detected in the re-synchronization detecting window without being detected in the synchronization detecting window a prescribed number of times in succession, the time interval of the re-synchronization window is updated. If the synchronization signal is detected in the re-synchronization window a prescribed number of times in succession, a re-synchronization counter outputs a re-synchronization establishment signal, the window generating circuit resets the position of the synchronization detecting window and generates the synchronization detecting window at a predetermined synchronization period, and the re-synchronization window generating circuit resets the re-synchronization window.

20 Claims, 7 Drawing Sheets

SYNCHRONIZATION SIGNAL DETECTOR, INFORMATION RECORDING/REPRODUCING APPARATUS, AND SYNCHRONIZATION SIGNAL DETECTING METHOD

FIELD OF THE INVENTION

This invention relates to a synchronization detecting circuit and, more particularly, to a synchronization signal detecting device and method ideal for application to an information recording/reproducing apparatus such as an optical disk, an information reproducing apparatus and an information recording/reproducing apparatus.

BACKGROUND OF THE INVENTION

When information is recorded on an optical disk such as a DVD (Digital Versatile Disk) or the like, a synchronization signal (SYN), which is a predetermined specific bit pattern, is written to the optical disk together with data at a fixed period in accordance with a recording format in order that the data may be read out. FIG. 5 illustrates an example of the format of a sector on an optical disk such as a DVD. In the example shown in FIG. 5, there are 13 rows, which are obtained by adding one row of an external parity code to a 182-byte, 12-row sector, where the 182 bytes are obtained by adding a 10-byte internal parity code to 172 bytes per row. A synchronization signal (32 channel bits in the example shown in FIG. 5) is inserted every 91 bytes. Data is 8/16-modulated and recorded and consists of 1456 channel bits. In FIG. 5, therefore, one sync frame comprises 32+1456=1488 channel bits (Cb). An overview of detection of synchronization in the reproducing system of an optical disk will be described below. For a description of a synchronization signal detecting circuit, refer to the specification of Japanese Patent Kokai Publication No. JP-P2000-3550A (pages 3, 5 and FIGS. 1, 6) (Patent Document 1).

FIG. 6 illustrates the structure of the reproducing system of an ordinary optical disk (see Patent Document 1). As shown in FIG. 6, information that has been recorded on an optical disk 120 is read by an optical pickup 121 and input to an RF amplifier 122. The signal (RF signal) that is output from the RF amplifier 122 is subjected to waveform equalization by a filter 123. The waveform-equalized signal is input to and converted to a binary data by a data binarizing circuit 124. The binary signal is input to a PLL (Phase-Locked Loop) circuit 125, which generates a channel clock signal synchronized to a channel bit. Serial data and the channel clock signal from the PLL circuit 125 are input to a synchronization signal detecting circuit 126, which detects synchronization. The output of the synchronization signal detecting circuit 126 is demodulated by a demodulating circuit 127.

The synchronization signal detecting circuit 126 detects the synchronization signal contained in the recorded signal and makes it possible for the recorded data signal to be reproduced in the correct format. The synchronization signal detecting circuit 126 detects synchronization by performing pattern matching to determine whether the synchronization signal matches the channel bit stream read out of the optical disk 120.

When read-out is started in the playback system shown in FIG. 6, the synchronization signal detecting circuit 126 performs pattern matching sequentially with respect to the channel bit stream until the synchronization signal can be detected. In order to suppress the probability that erroneous detection of the synchronization signal will occur owing to channel-bit error at read-out once the synchronization signal has been detected, the synchronization signal detecting circuit 126 subsequently performs pattern matching with the synchronization signal in accordance with the recording format only in the vicinity of a position at which a succeeding synchronization signal is expected to be detected in the entered channel bit stream.

There are instances where, owing to noise or the like, a bit pattern identical with the synchronization signal happens to exist in the data part of the channel bit stream that has been read out. Consequently, in order to avoid a situation in which the synchronization signal detecting circuit 126 erroneously detects such a false pattern as the synchronization pattern, detection of synchronization is carried out only over a period of time that includes a fixed length of time before and after the timing at which the synchronization pattern appears. This period of time in which matching with the synchronization signal is performed is referred to as a "window".

As is well known, synchronization-signal detection error in the synchronization signal detecting circuit 126 can be ascribed to any of the following:

burst error due to flaws on the optical disk;

random error due to random defects on the irradiating surface of the light source; and failure to detect the synchronization signal owing to disturbance of the synchronization period ascribable to external disturbances.

In the event that the synchronization signal cannot be detected temporarily, a technique commonly used is to create a window of adjusted size at a fixed period using the synchronization signal found last as the reference.

A synchronization signal detector of the kind shown in FIG. 7 is disclosed in Patent Document 1 as means capable of re-detecting a synchronization signal in the event of burst error or random error. As shown in FIG. 7, this conventional synchronization signal detector is such that a count value that is output from a forward protection counter 105 is decoded by a decoder 106, the decoded value is supplied to a window signal generating circuit 107 and the latter widens a pulse S106 from a timing generator 108 based upon the decoded value. By virtue of this arrangement, the window pulse width is changed in a case where the synchronization pattern cannot be detected owing to a burst defect ascribable to flaws or the like. In a case where detection of synchronization is not possible owing to random defects, control that will not change the window pulse width is performed. In Patent Document 1, components besides the decoder 106 are dealt with as prior art. These will be described in brief in order to facilitate an understanding of the operating principle of the synchronization signal detecting circuit.

A window control circuit 101 in FIG. 7 comprises an AND gate for controlling passage of serial data (a recording signal that has been read out) to a synchronization detecting circuit 102. If a synchronization signal (synchronization pattern) has been detected by the synchronization detecting circuit 102, then the latter generates a synchronization pattern detection pulse S101. A frame counter 103 counts a channel clock that is reproduced from an optical disk and generates a synchronization pattern prediction pulse S102 at a position at which synchronization is expected to be detected next, this being derived from the position at which synchronization was detected previously. It should be noted that the frame counter 103 is reset by the OR (the output of an OR gate 112) between the synchronization pattern detection pulse S101 and the synchronization pattern prediction pulse S102. A frame clock generating circuit 109 generates a frame clock using the synchronization pattern detection pulse S101 and the synchronization pattern prediction pulse S102.

A backward protection counter 104 counts up when the synchronization pattern detection pulse S101 and synchronization pattern prediction pulse S102 are output simultaneously and outputs a signal S103 (overflow), which indicates establishment of synchronization, when it counts up to a set value for backward protection.

The forward protection counter 105 receives the output signal S103 of the backward protection counter 104 as an enable signal EN, and receives and counts up the output of an Ex-OR (exclusive-OR) gate 111 the inputs to which are the synchronization pattern detection pulse S101 and synchronization pattern prediction pulse S102. When the forward protection counter 105 counts up to a set value for forward protection in a state in which synchronization has been established, the forward protection counter 105 construes loss of synchronization and outputs a signal S104, thereby resetting the backward protection counter 104. It should be noted that the forward protection counter 105 is reset by the synchronization pattern detection pulse S101. The pulse signal S104 indicative of loss of synchronization from the forward protection counter 105 and a window pulse S107 from the window signal generating circuit 107 enter an OR gate 113, which takes the OR between these two signals and delivers its output to the window control circuit 101.

If the set number for forward protection is "4", then the decoded value is "0" when the output of the forward protection counter 105 is "0", and the decoded values are ±α, ±2α and ±3α when the outputs of the forward protection counter 105 are "1", "2" and "3", respectively, where α is the minimum-unit value for widening the width of the window pulse on both sides thereof.

An arrangement in which dual windows (detection windows) are used to deal with disturbance of the synchronization period caused by external disturbance is known [see the specification of Japanese Patent Kokai Publication No. JP-A-10-199162 (Patent Document 2)]. According to Patent Document 2, first and second detection window creating circuits are provided and use is made of first and second detection windows and of a coincidence signal (a pulse that is output when coincidence is detected by a pattern comparing circuit that compares an input signal and a reference synchronization pattern). Whenever the period of the coincidence signal fluctuates, the detection windows are created alternatingly in conformity with the synchronization period of the coincidence pulse. In this conventional arrangement, the first and second detection window creating circuits set a detection window width of ±N clocks before and after the synchronization period during normal operation. When an external disturbance signal or the like is input, the detection window width is enlarged from ±N clocks to ±M clocks (M>N).

[Patent Document 1]

Japanese Patent Kokai Publication No. JP-P2000-3550A (pages 3 and 5, FIGS. 1 and 6)[Patent Document 2]

Japanese Patent Kokai Publication No. JP-A-10-199162 (pages 3-4, FIG. 1)

In order to gain an understanding of the problems to be solved by the present invention, the results of analysis and studies by the Inventors will be described in detail.

Assume a case where recording is performed to follow already existing data (recorded data) on a writable optical disk (inclusive of a write-once optical disk). From the newly recorded leading synchronization signal onward, the period of the synchronization signal successively recorded at the position corresponding to the synchronization period is a period the same as that of the synchronization signal present in the region in which recording has already been performed. However, there are cases where the synchronization signal present in the area in which recording has already been performed is not adopted as the reference.

On the other hand, assume a case where recording (e.g., write-once, etc.) is performed to follow already existing data on a writable optical disk. In order to maintain the interval between synchronization signals even in an area where recording is performed anew, it is necessary to perform recording with the same phase and same period using the synchronization signal present in the already recorded area as the reference. However, even if the period of the synchronization signal present in the already recorded area and the period of the synchronization signal in the newly recorded area are the same, there are instances where the phase will shift from the position of the leading synchronization signal recorded anew.

The following are considered to be the causes of this shift in recording:

start of recording from an incorrect position; and the position at which recording starts is correct but data that was written previously was recorded at the wrong position.

If the shift in recording becomes large, regardless of whichever of the above is the cause, detection of the synchronization signal becomes temporarily impossible and this results in burst error. If there is a shift in recording, there will be instances where the position of the synchronization signal departs significantly from the window.

In accordance with the results of studies by the Inventors, the following problems have been clarified in the conventional technique of attempting to detect the synchronization signal by creating a window at a fixed period in accordance with the format of the optical disk using the synchronization signal found last as the reference:

(A) Assume that the position of the synchronization signal has deviated far from the window. If the position of the synchronization signal departs from the position of the window when an attempt is made to detect the synchronization signal by enlarging the window, the width of the window (the length of time over which pattern matching is carried out) is enlarged correspondingly. As a result, there is a greater probability that the synchronization signal will be detected erroneously. Patent Document 2 is such that if the position of the synchronization signal deviates from the window by more than a prescribed amount, interpolation of the synchronization signal is performed using a reference synchronization pattern. However, there is absolutely no description concerning a method of generating a synchronization signal that deals with a shift in recording.

(B) A case where it is attempted to detect synchronization by performing pattern matching sequentially with respect to an input channel bit stream (serial data from the PLL circuit of FIG. 6) in a manner similar to that when reading of the disk starts and a case where a synchronization signal cannot be detected temporarily owing to burst error or the like cannot be distinguished from each other. It is necessary to attempt to detect synchronization by creating a window over a fixed period of time using the synchronization signal detected last as the reference. Consequently, it takes time to detect a synchronization signal that has deviated owing to a recording shift.

SUMMARY OF THE DISCLOSURE

A synchronization signal detector according to a first aspect of the present invention, comprises: a synchronization detecting circuit for detecting a synchronization signal in a first window from an input bit stream and detecting the synchronization signal from the input bit stream in a second window that is different from the first window; and a control circuit; wherein if the synchronization signal is not detected by the synchronization detecting circuit in the first window in a state in which the second window has been set to a prescribed time interval in a time range that excludes the first window, and the synchronization signal is detected by the synchronization detecting circuit in the second window a predetermined prescribed number of times in succession in accordance with a predetermined synchronization period, then the control circuit construes that re-synchronization has been established and exercises control in such a manner that the first window is generated periodically in accordance with the synchronization period using a synchronization detection position in the second window as a reference.

In the synchronization signal detector according to the present invention, the control circuit may initially set the time interval of the second window to a time interval that excludes the first window and the neighborhood thereof.

In the synchronization signal detector according to the present invention, in a case where the synchronization signal has been detected in the second window and not in the first window, the control circuit outputs the second window, which has been set to a prescribed length of time, at a position at which a succeeding synchronization signal is expected to be detected, using a synchronization-signal detection position in the second window as a reference.

In the synchronization signal detector according to the present invention, when re-synchronization has been established, the control circuit resets the time interval of the second window to a time interval that excludes the first window and the neighborhood thereof.

In the synchronization signal detector according to the present invention, the control circuit may include a circuit which, in a case where the synchronization signal is not detected in the first window, is for performing control to enlarge the time interval of the first window by a predetermined prescribed width and outputting the first window of enlarged width at a position at which a succeeding synchronization signal is expected to be detected, and a circuit for outputting a synchronization-establishment cancellation signal in a case where the synchronization signal is not detected a predetermined prescribed number of times in succession in accordance with the synchronization period in the first window.

A method of detecting a synchronization signal in a window from an input bit stream, in accordance with another aspect of the present invention, comprises:

(A) generating first and second windows that define time intervals for detecting a synchronization signal, and setting the second window to a prescribed time interval from which the first window and the neighborhood thereof have been excluded; and (B) if the synchronization signal is detected a predetermined prescribed number of times in succession in the second window without being detected in the first window, generating the first window at a predetermined synchronization period using the time at which the synchronization signal has been detected in the second window as a reference.

The meritorious effects of the present invention are summarized as follows.

In accordance with the present invention, a dual pattern detection area of a synchronization signal detecting circuit is adopted, erroneous detection of the synchronization signal is suppressed, the possibility of synchronization signal detection is improved and the time required for re-detecting the synchronization signal is shortened.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred modes for carrying out the present invention will be described below.

A synchronization signal detector according to a preferred mode for carrying out the present invention uses dual windows to solve the problem of the prior art that arises at read-out of data from a disk in which a recording shift, for example, has occurred. In this mode of practicing the invention, in addition to a circuit (11 in FIG. 1) that generates a window for detecting synchronization, a circuit (14 in FIG. 1) for generating a re-synchronization window is provided and it is so arranged that a synchronization signal that has shifted greatly from the synchronization detecting window owing to a recording shift or the like is detected by the re-synchronization window. Of course, one of ordinary skill in the art would recognize that one may alternatively denote window generating circuit 11 as a generically named circuit to generate a window, such as first window, second window, or third window, for example. Furthermore, window generating circuit 11, may, as is well known in the art, include sub-circuits that perform additional functions.

Figure 1:
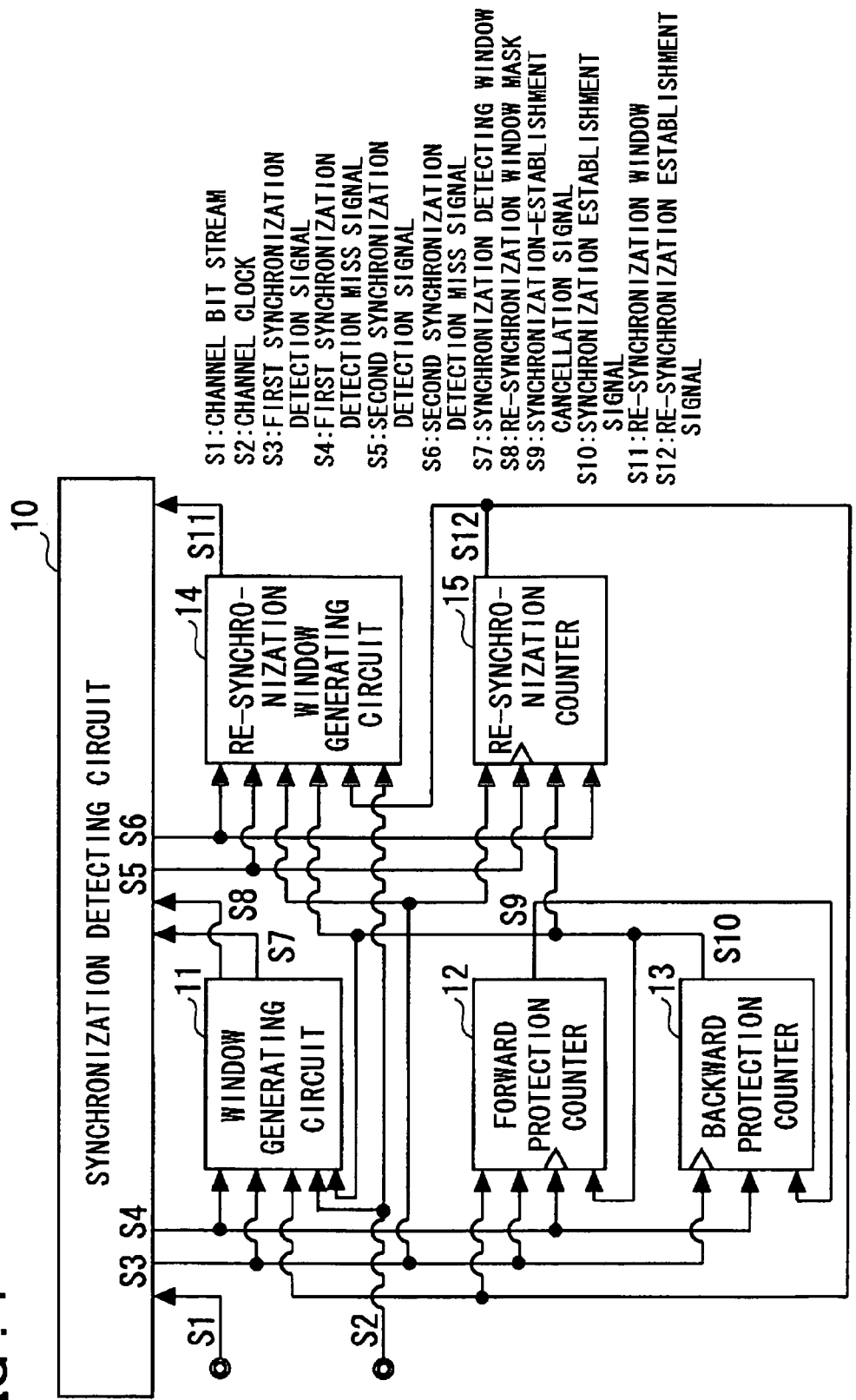
FIG. 1 is a diagram illustrating the structure of an embodiment of the present invention.
Figure 2:
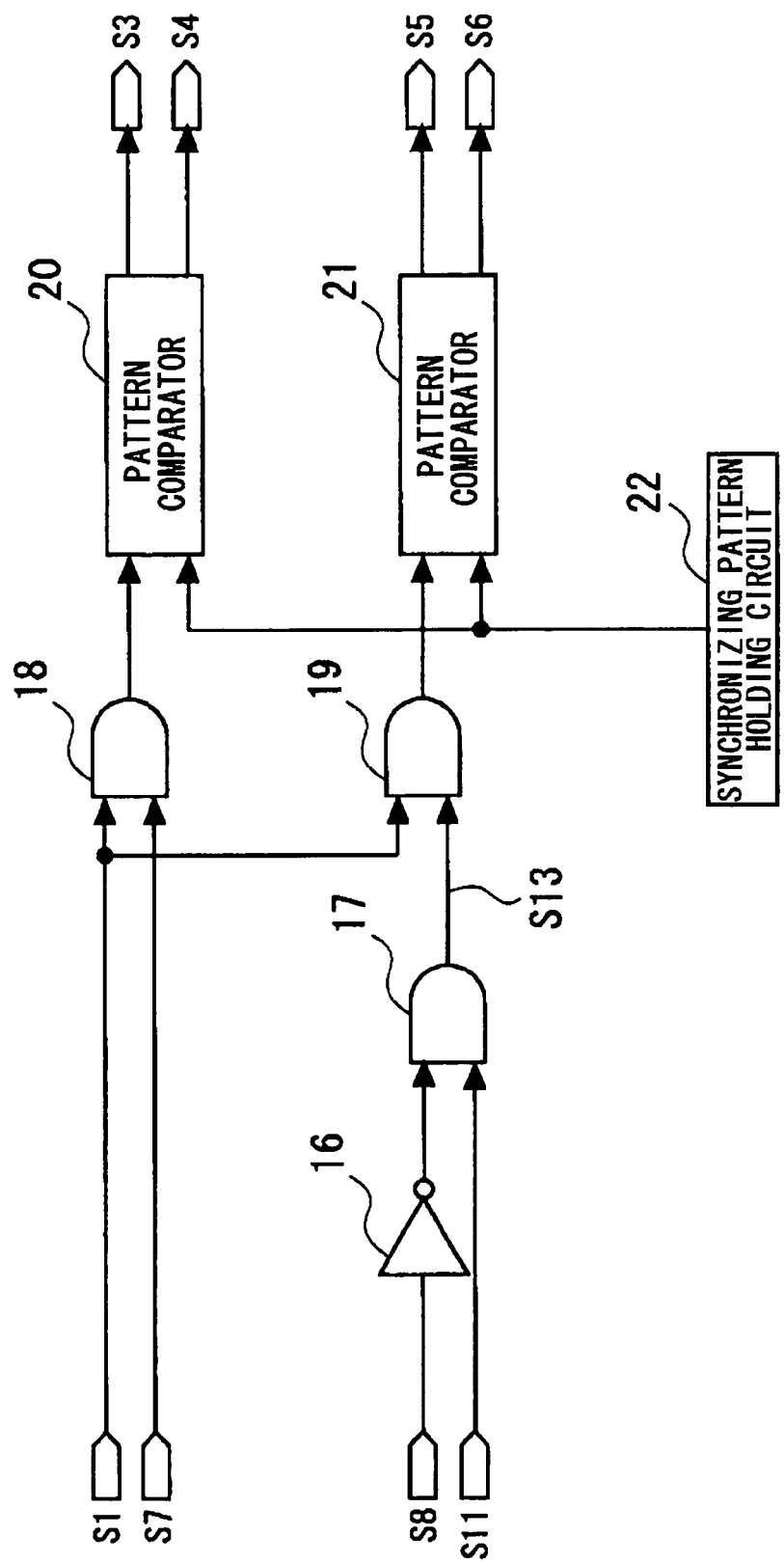
FIG. 2 is a diagram illustrating the structure of a synchronization detecting circuit according to an embodiment of the present invention.

More specifically, a synchronization signal detector according to a preferred mode for carrying out the present invention includes a window generating circuit (11 in FIG. 1) for generating a synchronization detecting window signal (S7 in FIG. 1) that defines a first time interval for detecting synchronization, and a re-synchronization window masking signal (S8 in FIG. 1) of a time interval the same as the synchronization detecting window or that includes the synchronization detecting window; a re-synchronization window generating circuit (14 in FIG. 1) for generating a re-synchronization window signal S11 that defines a second time interval for detecting synchronization; a circuit for generating a re-synchronization detecting window signal (S13 in FIG. 2), which comprises a time interval made up of the time interval of the re-synchronization window signal from which the re-synchronization window masking signal (S8 in FIG. 1) is excluded (S11 in FIG. 1); and a re-synchronization counter (15 in FIG. 1) for counting synchronization detections from a synchronization detecting circuit (10 in FIG. 1) by the re-synchronization detecting window signal (S13 in FIG. 2). The synchronization detecting circuit detects the synchronization signal from an input bit stream (channel bit stream) within a time interval defined by the synchronization detecting window signal (S7) and detects the synchronization signal from the input bit stream also within a time interval defined by the re-synchronization detecting window signal (S13 in FIG. 2). In this specification, the synchronization detecting window signal, re-synchronization window masking signal, re-synchronization window signal and re-synchronization detecting window signal are referred to as a synchronization detecting window, re-synchronization window mask, re-synchronization window and re-synchronization detecting window (the word "signal" being deleted from the end of each term), respectively. Further, detection of a synchronization signal within a time interval defined by, e.g., the synchronization detecting window signal will be expressed as detection of the synchronization signal within the synchronization detecting window. Of course, one of ordinary skill in the art may likewise denote window generating circuit 11 for generating a synchronization detecting window signal that defines a first time interval for detecting synchronization as simply a circuit to generate a first window. In addition, re-synchronization window generating circuit 14 for generating a re-synchronization window signal may be referred to, for example, as a circuit for generating a second window. Finally, a circuit for generating a re-synchronization detecting window signal may be referred to as a circuit for generating a third window.

If the re-synchronization counter (15 in FIG. 1) counts a prescribed number of synchronization detection signals (S5 in FIG. 1), which are output from synchronization detecting circuit (10 in FIG. 1) in a case where the synchronization detecting circuit (10 in FIG. 1) has detected the synchronization signal in the re-synchronization detecting window (S13 in FIG. 2) without detecting the synchronization signal a prescribed number of times in succession in the synchronization detecting window (S7 in FIG. 1), then the counter outputs a re-synchronization establishment signal (S12 in FIG. 1). Upon receiving this signal, the window generating circuit (11 in FIG. 1) generates the synchronization detecting window (S7 in FIG. 1) at a predetermined synchronization period using the synchronization detection position in the re-synchronization detecting window (S13 in FIG. 2) as a reference, and the re-synchronization window generating circuit (14), to which the re-synchronization establishment signal (S12) is input, resets the re-synchronization window (S11) fixedly to a high level, by way of example. Of course, one of ordinary skill in the art may alternatively and generically refer to a third window being reset when resynchronization has been established.

Figure 7:
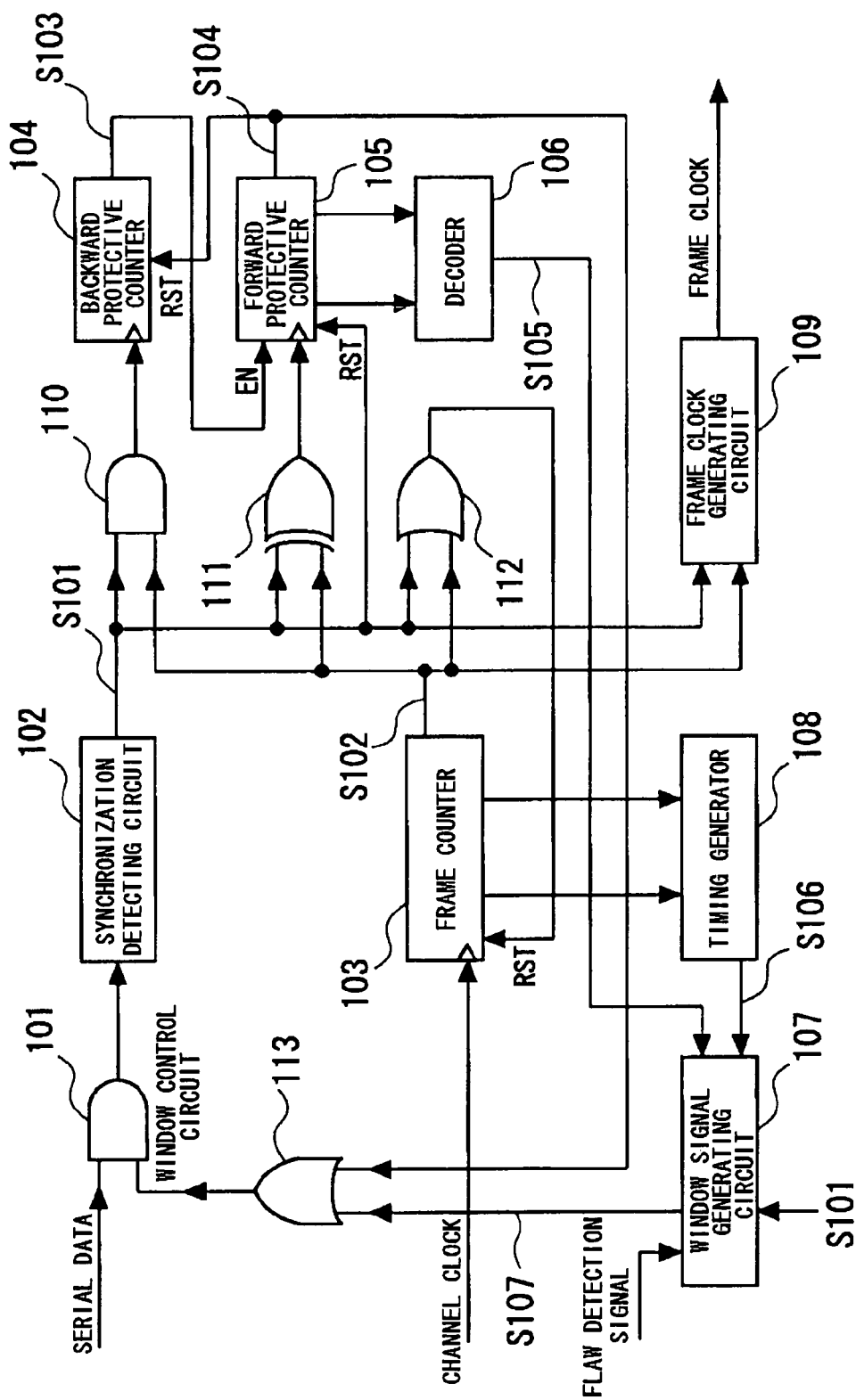
FIG. 7 is a diagram illustrating the structure of a conventional synchronization signal detector the window width of which can be varied.

In this mode of practicing the invention, a synchronization signal that has deviated greatly from the synchronization detection window owing to a recording shift or the like is subjected to synchronization detection in the re-synchronization window. In a case where burst error ascribable to flaws on the disk, random error due to random defects or disturbance of the synchronization period owing to external disturbances or the like has occurred besides synchronization detection error ascribable to recording shift, detection of the synchronization signal is performed by enlarging the synchronization detecting window in stages in a manner similar to that of the arrangement shown in FIG. 7. If the synchronization signal has been detected by the synchronization detecting circuit in the second window and not in the first window, then the control circuit exercises control to set the time interval of the second window to a predetermined length of time and to generate the second window at a position at which a succeeding synchronization signal is expected to be detected, using a detection position of the synchronization signal in the second window as a reference. Also, if synchronization has been detected a predetermined prescribed number of times in succession in the second window, then the control circuit exercises control for re-synchronization established to generate the first window in accordance with the synchronization period using a detection position of the synchronization signal in the second window as a reference.

In this mode of practicing the invention, a re-synchronization window mask wm that includes the enlarged portion of the synchronization detecting window is created and a time interval that is the result of excluding the time interval of the re-synchronization window mask wm from the time interval of the created re-synchronization window is adopted as the re-synchronization detecting window. The time interval of the re-synchronization window is taken to be a prescribed interval over a range obtained by subtracting the synchronization detecting window and the amount of enlargement ($\pm\alpha \cdot Pf$, where Pf represents a set number of times for forward protection) thereof from a length equivalent to one sync frame interval corresponding to one synchronization period, by way of example. The width wm of the re-synchronization window mask (S8 in FIG. 1) is given by Equation (1) below.

$$ws \leq wm \leq ws + \alpha \cdot Pf \quad (1)$$

where ws represents the width of the synchronization detecting window when the synchronization signal could not be detected, $\alpha$ represents the unit enlargement width of the synchronization detecting window and Pf is a set value used in generating a synchronization cancellation signal in a forward protection counter.

FIGS. 3A-3E are schematic views useful in describing the operating principle of the present invention based upon dual windows, namely a synchronization detecting window and a re-synchronization detecting window. As indicated in FIG. 3C, the width wm of the re-synchronization window mask is taken to be a range equivalent to the set value ws (of the synchronization detecting window)$\pm\alpha \cdot Pf$ [it should be noted that Pf=1 is assumed to hold in FIG. 3C]. The re-synchronization detecting window (S13 in FIG. 2) for detecting synchronization at the time of re-synchronization is taken to be a range of time from which the re-synchronization window mask wm is excluded, and it covers an interval that excludes the neighborhood of the synchronization detecting window. It should be noted that the re-synchronization window mask wm may of course be set be set to a value that somewhat exceeds the set maximum width of the synchronization detecting window.

FIGS. 3A-3E are diagrams useful in describing an example of a procedure for detecting a synchronization signal in this mode of practicing the present invention. Time is plotted along the horizontal axis. Operation for detecting a synchronization signal in this mode of practicing the invention will be described with reference to FIGS. 3A-3E.

Figure 3:
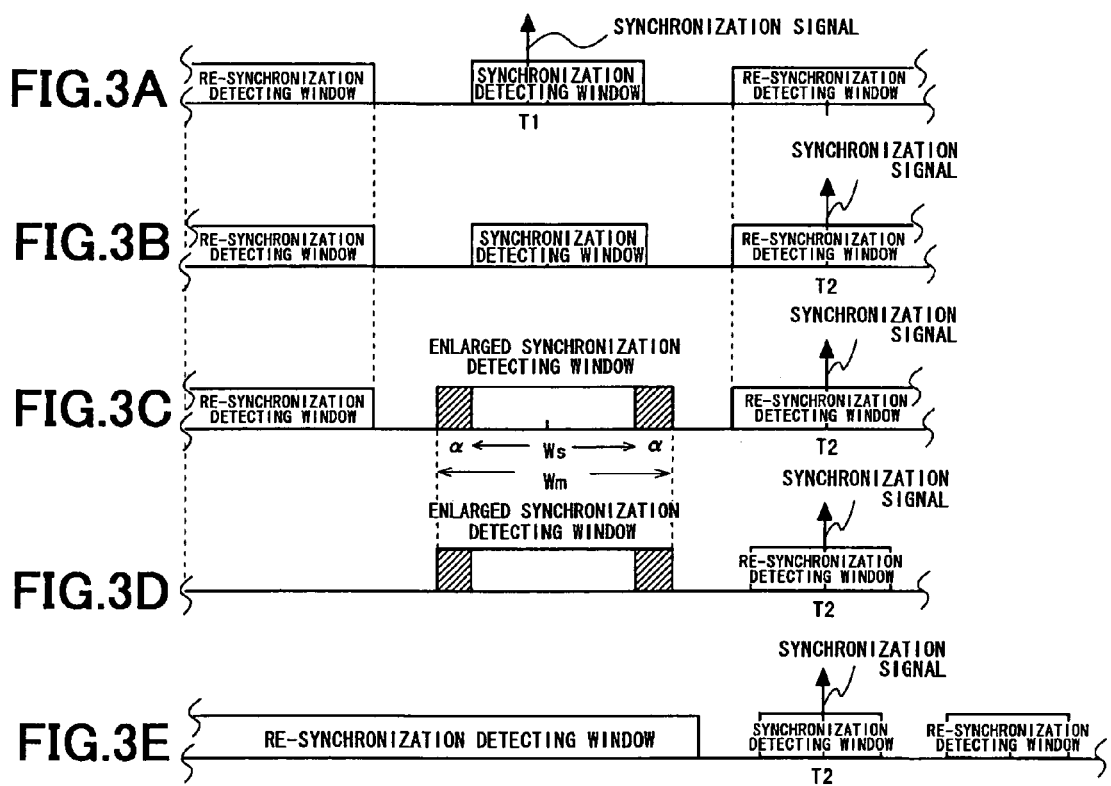
FIGS. 3A, 3B, 3C, 3D and 3E are diagrams for describing the operation of the present invention and the relationship between a synchronization detecting window and a synchronization re-detecting window.

In FIG. 3A, a synchronization signal at time T1 (referred to also as "position T1" on the time axis) is detected in the synchronization detecting window (S7 in FIG. 1) and synchronization has been established. It should be noted that a synchronization signal is not detected in a re-synchronization detecting window at this time. Furthermore, although the timing at which the synchronization signal appears is represented by a point on the time axis in FIG. 3, in actuality this is a length of time equivalent to length of 32 channel bits.

In FIG. 3B, the synchronization signal is at position T2, which is a large departure from the synchronization detecting window, owing to recording shift or the like. The synchronization signal is not detected in the synchronization detecting window.

Accordingly, In FIG. 3C, detection of synchronization is attempted upon enlarging the pulse width of the synchronization detecting window ws by $\pm\alpha \cdot Pf$ in conformity with the set number of times for forward protection. In this case, synchronization is not detected in the enlarged synchronization detecting window. Since synchronization cannot be detected Pf times in succession, where Pf is the set number of times for forward protection, this means that synchronization has deviated (a state in which synchronization has been cancelled). However, the synchronization signal at position T2 is detected in the re-synchronization detecting window signal (S13 in FIG. 2) at this time.

In this mode of practicing the invention, it is determined that re-synchronization has been established in a case where the synchronization signal has been detected in the re-synchronization detecting window (S13 in FIG. 2), e.g., in a case where the width of the re-synchronization detecting window has been reduced and synchronization has been detected a predetermined prescribed number of times in succession in accordance with the synchronization period in the re-synchronization detecting window of reduced width, as indicated in FIG. 3D. Thus, in this mode of practicing the invention, if detection of synchronization in the re-synchronization detecting window is performed in a state in which synchronization is not detected in the synchronization detecting window, the possibility of erroneous detection of the synchronization signal is reduced by narrowing the width of the re-synchronization detecting window.

In this mode of practicing the invention, if re-synchronization is established, then the synchronization detecting window (the width of which is the original width ws, by way of example) is generated in accordance with the synchronization period using the synchronization detection position T2, at which re-synchronization was established, as the reference, as indicated in FIG. 3E. The re-synchronization detecting window is generated anew so as to cover an area that does not include the synchronization detecting window ws and the neighborhood thereof. The present invention will now be described in detail in accordance with an embodiment thereof.

FIG. 1 is a diagram illustrating the circuit structure of an embodiment of the present invention. As shown in FIG. 1, the synchronization signal detector according to this embodiment of the invention includes a synchronization detecting circuit 10, a window generating circuit 11, a forward protection counter 12, a backward protection counter 13, a re-synchronization window generating circuit 14 and a re-synchronization counter 15.

Figure 6:
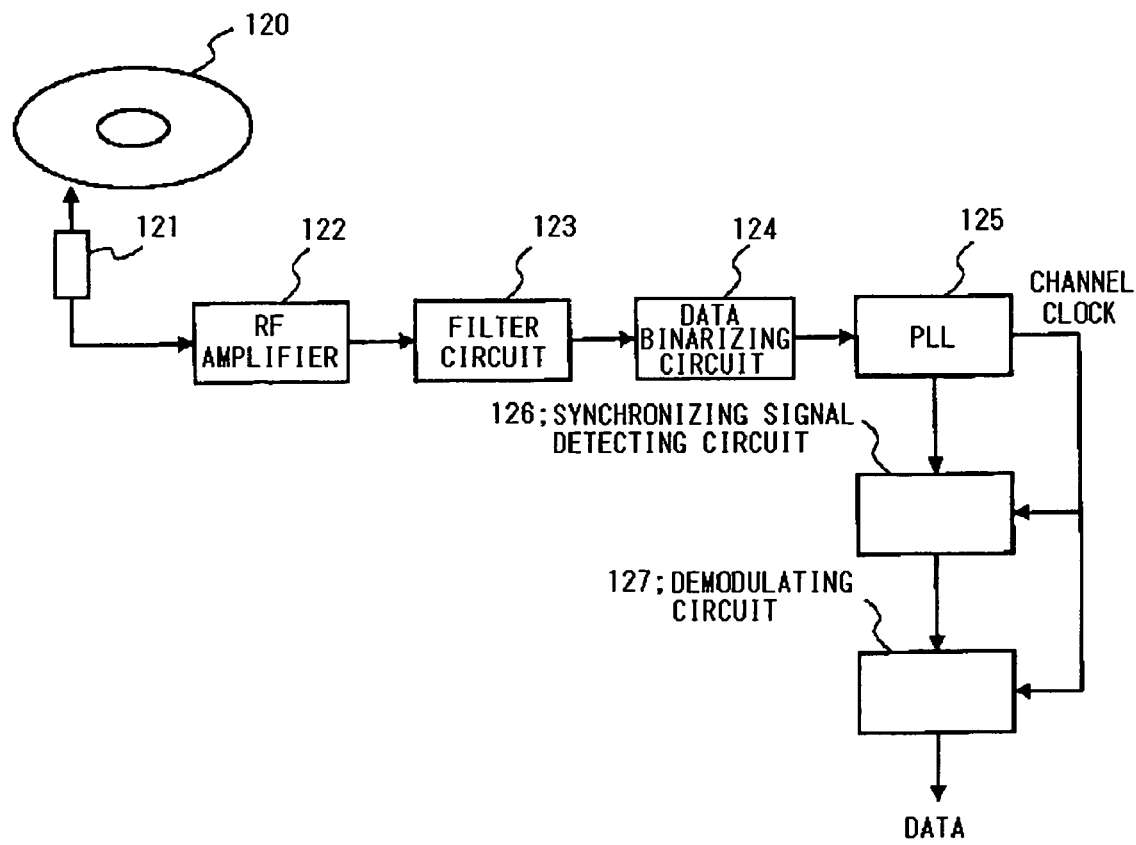
FIG. 6 is a diagram illustrating the structure of an optical-disk playback system.

The inputs to the synchronization detecting circuit 10 are a channel bit stream (serial data) S1 and channel clock S2 that are output from a PLL circuit (not shown in FIG. 1, but refer to PLL circuit 125 in FIG. 6), a synchronization detecting window S7 and re-synchronization window mask S8 that are output from a window generating circuit 11, and a re-synchronization window S11 that is output from a re-synchronization window generating circuit 14. The synchronization detecting circuit 10 outputs a first synchronization detection signal S3, a first synchronization detection miss signal S4, a second synchronization detection signal S5 and a second synchronization detection miss signal S6.

The first synchronization detection signal S3, first synchronization detection miss signal S4, channel clock S2, a synchronization establishment signal S10 and a re-synchronization establishment signal S12 are input to the window generating circuit 11, which outputs the synchronization detecting window S7 and the re-synchronization window mask 8. The window generating circuit 11, which as one example is equipped with a timer counter (not shown). The timer counter counts the channel clock S2 using the first synchronization detection signal S3 as a trigger. The window generating circuit 11 further includes a circuit (not shown) for generating the synchronization detecting window S7 (the pulse width whereof is set variably) when the timer counter has counted pulses equivalent to one synchronization period, and a circuit (not shown) for generating the re-synchronization window mask S8 that satisfies Equation (1).

The first synchronization detection signal S3, first synchronization detection miss signal S4 and synchronization establishment signal S10 are input to the forward protection counter 12 as reset signals, and the forward protection counter 12 outputs a synchronization-establishment cancellation signal S9. The forward protection counter 12 counts up the first synchronization detection miss signal S4 (a one-shot pulse) input thereto. If the first synchronization detection miss signal S4 enters the counter 12 successively a set number of times for forward protection, then the forward protection counter 12 outputs an overflow signal as the synchronization-establishment cancellation signal S9. If the first synchronization detection signal S3 is activated, the count value in the forward protection counter 12 is reset.

The first synchronization detection signal S3, first synchronization detection miss signal S4 and synchronization-establishment cancellation signal S9 are input to the backward protection counter 13, which outputs the synchronization establishment signal S10. The backward protection counter 13 counts up the first synchronization detection signal S3 (a one-shot pulse) input thereto. If the first synchronization detection signal S3 enters the counter 13 successively a set number of times for backward protection, then the backward protection counter 13 outputs an overflow signal as the synchronization establishment signal S10. If the first synchronization detection miss signal S4 is activated, the count value is reset. Further, the backward protection counter 13 is reset by the synchronization-establishment cancellation signal S9 that is output from the forward protection counter 12.

The second synchronization detection signal S5, second synchronization detection miss signal S6, first synchronization detection signal S3, synchronization establishment signal S10, channel clock S2, and re-synchronization establishment signal S12, which is output from the re-synchronization counter 15, enter the re-synchronization window generating circuit 14, which outputs the re-synchronization window S11. The re-synchronization window generating circuit 14 has a circuit (not shown) which, when reset, outputs the re-synchronization window signal S11 in the activated state (e.g., fixed at the high level). The circuit receives the second synchronization detection signal S5 (a one-shot pulse), deactivates the re-synchronization window signal S11 (e.g., sends it to the low level) temporarily and generates the pulse width (the time interval) of the re-synchronization window signal S11, which has been set to a prescribed width, at a position at which synchronization is expected to be detected next.

The re-synchronization window generating circuit 14 is reset upon receiving the re-synchronization establishment signal S12 from the re-synchronization counter 15, and is reset also in a case where the synchronization establishment signal S10 is received from the backward protection counter 13.

The second synchronization detection signal S5, second synchronization detection miss signal S6, first synchronization detection signal S3 and synchronization establishment signal S10 enter the re-synchronization counter 15, which outputs the re-synchronization establishment signal S12. The re-synchronization counter 15 counts the second synchronization detection signal S5 (one-shot pulse). If the second synchronization detection signal S5 enters a prescribed number of times in succession, the re-synchronization counter 15 outputs an overflow signal in the activated state (e.g., at the high level) as the re-synchronization establishment signal S12 and clears the count value. As a result, the overflow signal also is reset and the re-synchronization establishment signal S12 is output as a one-shot pulse. The re-synchronization counter 15 is reset by the second synchronization detection miss signal S6. In a case where the first synchronization detection signal S3 has been output, the re-synchronization counter 15 has its count value reset. The re-synchronization counter 15 is reset also in a case where it receives the synchronization establishment signal S10 from the backward protection counter 13.

FIG. 2 is a diagram illustrating the structure of the synchronization detecting circuit 10 in FIG. 1. A first window control circuit (AND gate) 18, an input to which is a channel bit stream (serial data) S1 that is output from a PLL circuit (125 in FIG. 6), supplies the channel bit stream to a first pattern comparator circuit 20 during the time that the synchronization detecting window S7 is at the high level. When the channel bit stream and a synchronization pattern (32 channel bits) from a synchronization pattern holding circuit 22 match, the first pattern comparator circuit 20 outputs a one-shot pulse as the first synchronization detection signal S3. When the two signals do not match, the comparator circuit 20 outputs a one-shot pulse as the first synchronization detection miss signal S4.

The synchronization detecting circuit 10 includes an inverter 16 for inverting and outputting the re-synchronization window masking signal S8 applied thereto, and an AND gate 17, the inputs to which are the output signal of the inverter 16 and the re-synchronization window S11 from the re-synchronization window generating circuit 14, for taking the AND between these two signals and outputting it as the re-synchronization detecting window S13. A second window control circuit (AND gate) 19, an input to which is the channel bit stream (serial data) S1 that is output from a PLL circuit (125 in FIG. 6), supplies the channel bit stream to a second pattern comparator circuit 21 during the time that the re-synchronization detecting window S13, which is output from the AND gate 17, is at the high level. When the channel bit stream and the synchronization pattern (32 channel bits) from the synchronization pattern holding circuit 22 match, the second pattern comparator circuit 21 outputs a one-shot pulse as the second synchronization detection signal S5. When the two signals do not match, the comparator circuit 21 outputs a one-shot pulse as the second synchronization detection miss signal S6. It should be noted that the synchronization pattern holding circuit 22 stores and holds the synchronization pattern (SYN) internally and supplies it to the first and second pattern comparator circuits 20 and 21.

The operation of this embodiment will now be described with reference to FIGS. 1 and 2.

When data starts to be read out of the optical disk in this embodiment, the window generating circuit 11 enlarges the synchronization detecting window S7 to the entirety of the channel bit stream read. That is, when data starts to be read out, the window generating circuit 11 fixes the synchronization detecting window S7 at, e.g., the high level for the duration of one or a plurality of sync frames. If it is attempted to detect a synchronization signal, the reference of which is the synchronization period, by the synchronization detecting circuit 10 and the synchronization signal is detected, a backward protection operation, described later, is carried out. If the synchronization signal is detected in the synchronization detecting window S7, the synchronization detecting circuit 10 outputs the first synchronization detection signal S3 (one-shot pulse). If the synchronization signal cannot be detected in the synchronization detecting window signal S7, then the synchronization detecting circuit 10 outputs the first synchronization detection miss signal S4 (one-shot pulse).

If the synchronization signal is detected in the synchronization detecting window signal S7 and the one-shot pulse of the first synchronization detection signal S3 enters, the window generating circuit 11 sets timing, the reference of which is the synchronization period, based upon this pulse, creates the synchronization detecting window S7 every synchronization period (a period of time equivalent to one sync frame) and supplies the window to the synchronization detecting circuit 10. The latter attempts to detect the synchronization signal of the next period in the synchronization detecting window S7.

In a case where the first synchronization detection miss signal S4 (one-shot pulse) has been output from the synchronization detecting circuit 10, the window generating circuit 11 enlarges the pulse width of the synchronization detecting window S7 by ±α, and outputs the synchronization detecting window S7 to the synchronization detecting circuit 10 again at a timing corresponding to the next synchronization period (namely at a position at which synchronization is expected to be detected next), and the synchronization detecting circuit 10 attempts to detect the synchronization signal.

On the other hand, if the one-shot pulse of the first synchronization detection signal S3 from the synchronization detecting circuit 10 has been received and synchronization has been detected, then the window generating circuit 11 sets timing, the reference of which is the synchronization period, based upon the first synchronization detection signal S3, sets the pulse width of the synchronization detecting window S7 to the initial value ws and outputs the synchronization detecting window signal S7 at a timing corresponding to the next synchronization period (namely at a position at which synchronization is expected to be detected next).

The backward protection counter 13 counts up the first synchronization detection signal S3 (one-shot pulse) input thereto from the synchronization detecting circuit 10, detects the synchronization signal continuously in the synchronization detecting window S7, activates the overflow signal when the count value in the counter 13 attains a prescribed count for backward protection, and outputs the activated (high-level)

overflow signal as the synchronization establishment signal S10. It should be noted that the backward protection counter 13 clears the count value if the first synchronization detection miss signal S4 (one-shot pulse) is output from the synchronization detecting circuit 10.

In a case where the synchronization establishment signal S10 from the backward protection counter 13 enters, the synchronization establishment signal S10 is activated and synchronization is established, the window generating circuit 11 generates the synchronization detecting window S7 every synchronization period (sync frame). That is, if synchronization is established and the synchronization signal is detected in the synchronization detecting window S7 by the synchronization detecting circuit 10, then the window generating circuit 11 sets timing, the reference of which is the synchronization period, in accordance with the first synchronization detection signal S3 (one-shot pulse) input thereto, and generates and outputs the synchronization detecting window S7 of pulse width ws in accordance with the synchronization period (sync frame) using as a reference the position at which the synchronization signal was detected. Thus, control at the time of establishment of synchronization is performed.

The re-synchronization operation of this embodiment will be described starting from the state in which synchronization has been established.

In a case where synchronization cannot be detected in the synchronization detecting window S7 and the first synchronization detection miss signal S4 is output from the synchronization detecting circuit 10 in the state of synchronization establishment, a transition is made to operation by the forward protection counter 12. Specifically, whenever the first synchronization detection miss signal S4 (one-shot pulse) enters from the synchronization detecting circuit 10, the forward protection counter 12 counts up the count value. When the first synchronization detection miss signal S4 is output from the synchronization detecting circuit 10 at this time, the window generating circuit 11 enlarges the width of the periodically produced synchronization detecting window S7 in stages (±α, ±2α, . . . ) and an attempt is made to detect synchronization at a position at which synchronization is expected to be detected next. That is, if synchronization cannot be detected in the width ws of the synchronization detecting window S7, the window generating circuit 11 enlarges the width of the synchronization detecting window S7 by one step to ws±α. If synchronization cannot be detected in the synchronization detecting window S7 of this width at the position at which synchronization is expected to be detected next, the window generating circuit 11 enlarges the width of the synchronization detecting window S7 further to ws±2α.

If detection of synchronization is performed by the synchronization detecting circuit 10 in a state in which the width of the synchronization detecting window S7 has been enlarged, then the window generating circuit 11 receives the first synchronization detection signal S3 (one-shot pulse), sets timing the reference of which is the synchronization period and creates the synchronization detecting window S7 (of width ws) again every synchronization period.

On the other hand, if detection of synchronization is not performed by the synchronization detecting circuit 10 in a state in which the width of the synchronization detecting window S7 has been enlarged, then the synchronization detecting circuit 10 outputs the first synchronization detection miss signal S4 continuously. If the count value in the forward protection counter 12 attains the prescribed set count for forward protection, then the forward protection counter 12 outputs the overflow signal in the activated state. The overflow signal in the activated state is input to the backward protection counter 13 as the synchronization-establishment cancellation signal S9.

After the activated synchronization-establishment cancellation signal S9 is input thereto, the backward protection counter 13 changes its output, namely the synchronization establishment signal S10, from the activated (high-level) to the deactivated (low-level) state, thereby canceling the established synchronization.

In this embodiment, the synchronization detecting circuit 10 is such that the neighborhood of the time width of the synchronization detecting window S7 is excluded, as described above, and therefore detection of synchronization is attempted based upon the re-synchronization detecting window S13 (see FIG. 2), which has masked the re-synchronization window S11 output from the re-synchronization window generating circuit 14 by the re-synchronization window masking signal S8 that is output from the window generating circuit 11. This constitutes one characterizing feature of the present invention and makes it possible to detect a synchronization signal that has deviated far from the synchronization detecting window.

In this embodiment, the re-synchronization detecting window S13 (see FIG. 2) is placed in the activated state for a period of time obtained by subtracting the pulse width of the re-synchronization window masking S8 from the re-synchronization window S11. When the synchronization detecting circuit 10 detects the synchronization signal within the re-synchronization detecting window S13 (see FIG. 2), it outputs the second synchronization detection signal S5 (one-shot pulse). When the synchronization detecting circuit 10 cannot detect the synchronization signal within the re-synchronization detecting window signal S13, it outputs the second synchronization detection miss signal S6 (one-shot pulse).

If the synchronization detecting circuit 10 outputs the second synchronization detection signal S5 in respect to the re-synchronization window signal S11, the re-synchronization window generating circuit 14 resets the synchronization period of the re-synchronization window S11. That is, when synchronization is detected within the re-synchronization detecting window S13 in the synchronization detecting circuit 10 and the second synchronization detection signal S5 (one-shot pulse) is output [on the condition that the first synchronization detection signal S3 (one-shot pulse) is not output], the re-synchronization window generating circuit 14 temporarily resets the re-synchronization window S11 from the fixed high level to the low level based upon the pulse of the second synchronization detection signal S5, creates the re-synchronization window signal S11 of the prescribed width every synchronization period using the synchronization detection position as the reference and supplies the signal S11 to the synchronization detecting circuit 10.

The synchronization detecting circuit 10 attempts to detect synchronization within the re-synchronization detecting window S13, which comprises the AND between the re-synchronization window S11 and the signal that is the inverse of the re-synchronization window mask S8. In a case where synchronization cannot be detected by the synchronization detecting circuit 10 with respect to the re-synchronization window S11, the re-synchronization window generating circuit 14 widens the re-synchronization window S11 to the entirety of the read bit stream (fixes the re-synchronization window S11 at the high level) and an attempt is made to detect the second synchronization detection signal S5 using the timing at which the re-synchronization window S11 is generated as the reference.

The re-synchronization counter 15 counts the second synchronization detection signal S5 (one-shot pulse), which is output from the synchronization detecting circuit 10 when detection of synchronization has been performed within the re-synchronization detecting window S13. The second synchronization detection signal S5 (one-shot pulse) is output successively every synchronization period. When the count value in the re-synchronization counter 15 reaches the prescribed value, the counter 15 outputs the re-synchronization establishment signal S12 on the grounds that re-synchronization has been established and clears the count value. Furthermore, the re-synchronization counter 15 clears its count value if the second synchronization detection miss signal S6 (one-shot pulse) has been output from the synchronization detecting circuit 10.

When the re-synchronization counter 15 outputs the re-synchronization establishment signal S12 (one-shot pulse), the re-synchronization window generating circuit 14 widens the re-synchronization window S11 to the entirety of the read bit stream. That is, the re-synchronization window generating circuit 14 fixes the re-synchronization window S11 at the high level.

The window generating circuit 11 to which the re-synchronization establishment signal S12 has been input from the re-synchronization counter 15 resets the reference timing of the synchronization period of synchronization detecting window S7 and an attempt is made to detect synchronization at the timing at which re-synchronization was established. That is, when the re-synchronization establishment signal S12 enters from the re-synchronization counter 15, the window generating circuit 11 generates the synchronization detecting window S7 at the position of the next synchronization period using as a reference the synchronization detection position within the re-synchronization detecting window S13. Further, when the re-synchronization establishment signal S12 (one-shot pulse) enters from the re-synchronization counter 15, the forward protection counter 12 clears its count value.

In the example of the structure of the synchronization detecting circuit 10 of FIG. 1 described above, the first pattern comparator circuit 20 and second pattern comparator circuit 21 are provided in correspondence with the first window control circuit 18 and second window control circuit 19, respectively, the first pattern comparator circuit 20 outputs the first synchronization detection signal S3 and first synchronization detection miss signal S4, and the second pattern comparator circuit 21 outputs the second synchronization detection signal S5 and second synchronization detection miss signal S6. However, it goes without saying that the present invention is not limited solely to this arrangement. For example, a single pattern comparator circuit will suffice. In such case the first window control circuit 18 in FIG. 2 is so adapted as to output a high-impedance state (output-disable state) when the synchronization detecting window S7 is in the deactivated state, and to attain the output-enable state and pass the entered channel bit stream S1 when the synchronization detecting window S7 is in the activated state. Similarly, the second window control circuit 19 is so adapted as to output a high-impedance state (output-disable state) when the re-synchronization detecting window S13 is in the deactivated state, and to attain the output-enable state and pass the entered channel bit stream S1 when the re-synchronization detecting window signal S13 is in the activated state. The first window control circuit 18 and second window control circuit 19 are connected together and connected to the input of the single pattern comparator circuit. The reason for this is that the activated periods of the synchronization detecting window S7 and re-synchronization detecting window S13 do not overlap in terms of time. A distributor that receives the synchronization detection signal and synchronization detection miss signal from the single pattern comparator circuit is provided downstream of the single pattern comparator circuit. The distributor performs a changeover operation in which it outputs the first synchronization detection signal S3 and the first synchronization detection miss signal S4 in conformity with the activated period of the synchronization detecting window S7, and outputs the second synchronization detection signal S5 and second synchronization detection miss signal S6 in conformity with activated period of the synchronization detecting window S7.

Figure 4:
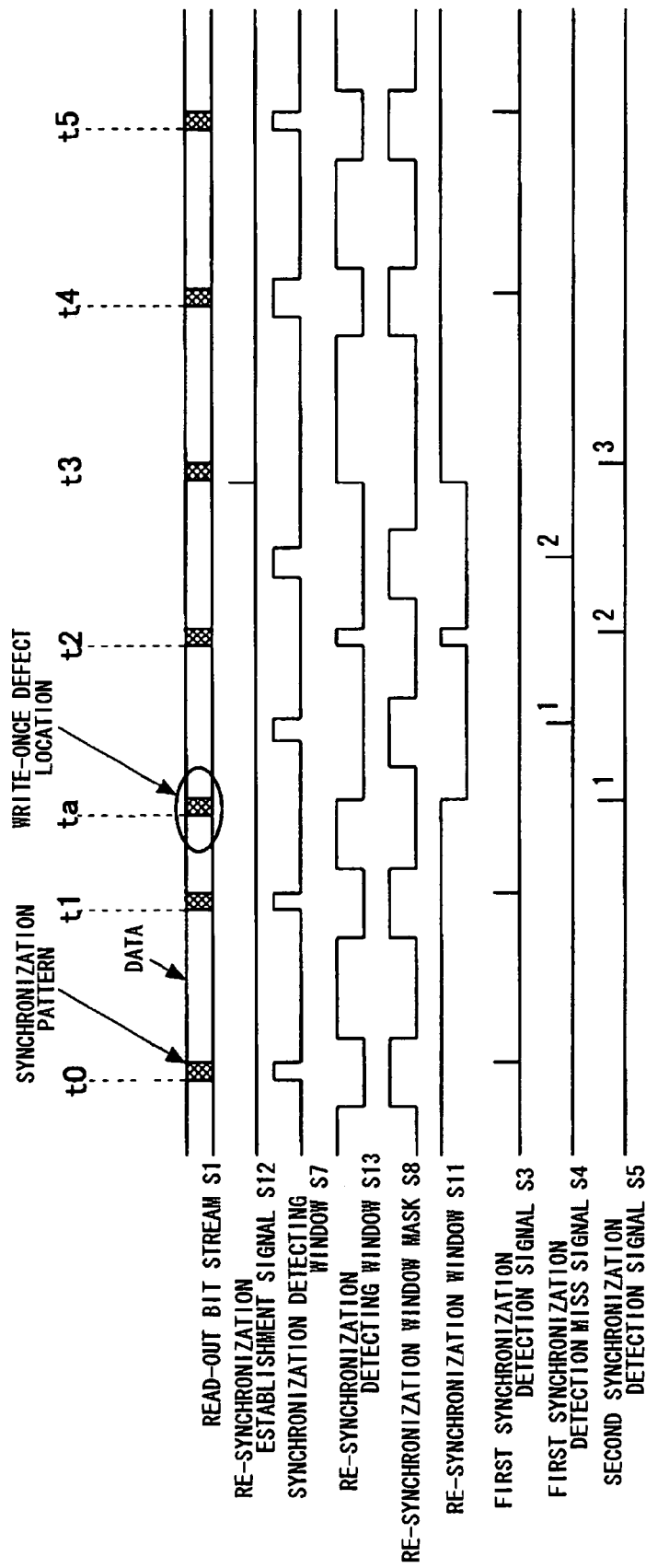
FIG. 4 is a timing chart for describing the operation of an embodiment of the present invention.
Figure 5:
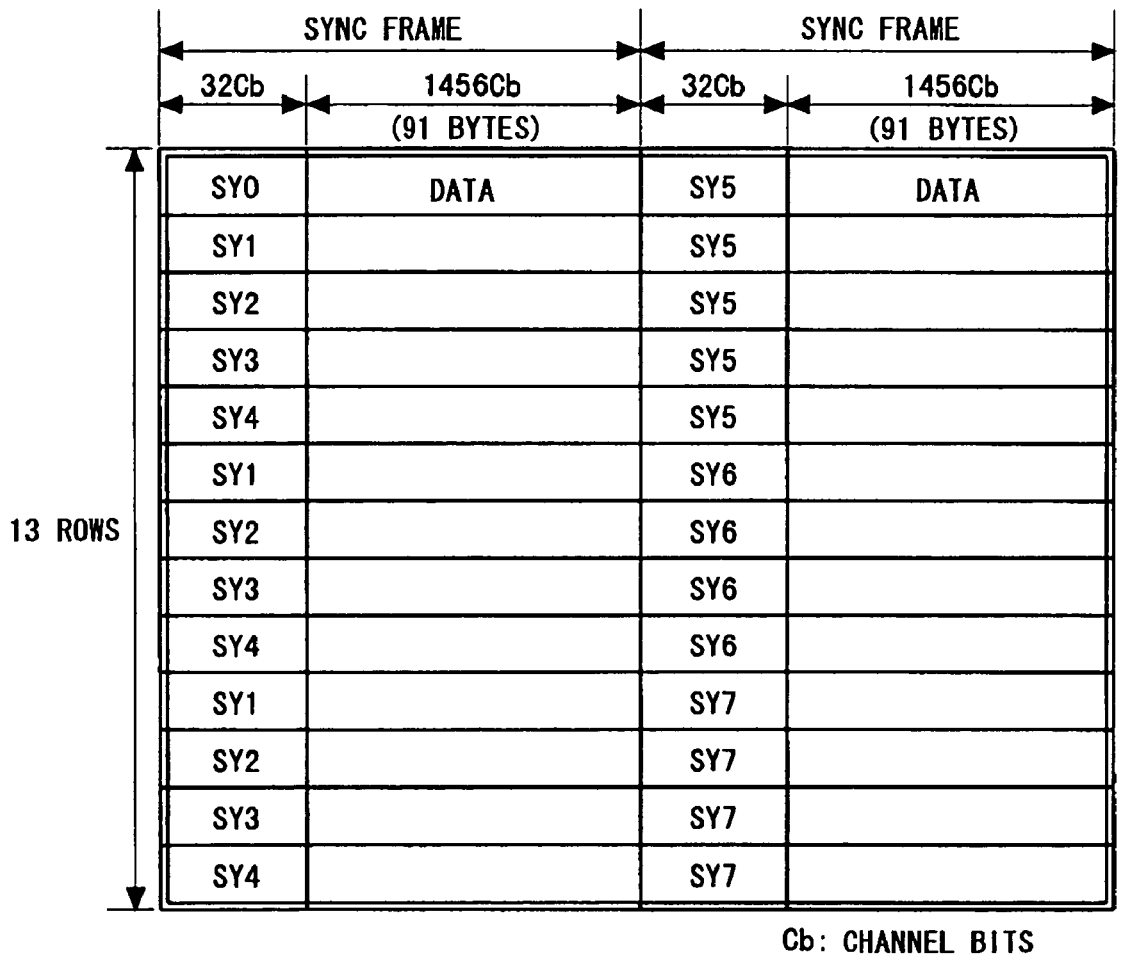
FIG. 5 is a diagram illustrating the structure of the physical sector of a DVD.

FIG. 4 is a timing chart illustrating an example of a timing operation in a case where the re-synchronization establishment signal S12 is output when the count value of re-synchronization counter 15 attains a value of "3" at readout of a disk in which a recording shift has occurred. FIG. 4 illustrates an example of the timing waveforms of the readout bit stream S1, re-synchronization establishment signal S12, synchronization detecting window S7, re-synchronization detecting window S13, re-synchronization window mask S8, re-synchronization window S11, first synchronization detection signal S3, first synchronization detection miss signal S4 and second synchronization detection signal S5.

In FIG. 4, the re-synchronization window S11 initially is fixed at the high level, exceeding the sync frame (the entirety of the readout channel bit stream). If the synchronization signal is detected within the synchronization detecting window S7, the one-shot pulse of the first synchronization detection signal S3 is output from the synchronization detecting circuit 10. If the synchronization signal is detected within the synchronization detecting window S7 of the next synchronization period, the first synchronization detection signal S3 (one-shot pulse) is output from the synchronization detecting circuit 10. Since the synchronization signal is not detected within the re-synchronization detecting window S13 at this time, the second synchronization detection signal S5 is not output.

If a synchronization signal has been recorded at a write-once defect location (see the readout bit stream S1 at time ta in FIG. 4), the synchronization signal is detected within the re-synchronization detecting window S13 and the second synchronization detection signal S5 [one-shot pulse (1)] is output from the synchronization detecting circuit 10. At this time the first synchronization detection miss signal S4 is output without the first synchronization detection signal S3 being output. The one-shot pulse of the first synchronization detection miss signal S4 is output twice in succession.

The re-synchronization window generating circuit 14 receives the second synchronization detection signal S5 [one-shot pulse (1)] that is output from the synchronization detecting circuit 10 and resets the synchronization period of the re-synchronization window S11. That is, the re-synchronization window generating circuit 14 temporarily sets the re-synchronization window S11 to the low level from the high level (see time ta in FIG. 4) and outputs the re-synchronization window signal S11 of the prescribed pulse width (see the pulse of re-synchronization window S11 at time t2 in FIG. 4) in accordance with synchronization period using as a reference the synchronization detection position within the re-synchronization detecting window S13.

Since the synchronization signal is not detected within the synchronization detecting window S7 between the times t2 and t3, the first synchronization detection signal S3 is not output from the synchronization detecting circuit 10 and the synchronization pattern is detected within the re-synchronization detecting window S13 created from the re-synchronization window S11 and re-synchronization window mask S8. As a result, the second synchronization detection signal S5 [one-shot pulse (2)] is output at time t2 in FIG. 4. Further, the first synchronization detection miss signal S4 [one-shot pulse (2)] is output in correspondence with the position of the synchronization detecting window S7 between the times t2 and t3 in FIG. 4.

The re-synchronization counter 15 counts the second synchronization detection signal S5 (one-shot pulse), which is output from the synchronization detecting circuit 10, three times in succession at times ta, t2 t3 in FIG. 4 and outputs the re-synchronization establishment signal S12 (one-shot pulse) at time t3. The re-synchronization counter 15 outputs the re-synchronization establishment signal S12 (one-shot pulse), whereupon the counter is cleared automatically.

Upon receiving the re-synchronization establishment signal S12 (one-shot pulse), the re-synchronization window generating circuit 14 resets the re-synchronization window S11 and fixes it at the high level. Further, upon receiving the re-synchronization establishment signal S12 (one-shot pulse), the window generating circuit 11 outputs the synchronization detecting window S7 (of width ws), based upon the re-synchronization establishment signal S12 (one-shot pulse), periodically in units of the synchronization period using as a reference the synchronization detection position within the re-synchronization detecting window S13.

As a result, the first synchronization detection signal S3 (one-shot pulse) is output successively from the synchronization detecting circuit 10 from time t4 onward, and the backward protection counter 13 outputs the synchronization establishment signal S10 when it counts up to the set value for backward protection. The time interval of the re-synchronization detecting window S13 from time t4 onward is set to a range of times that excludes the synchronization detecting window S7 and the neighborhood thereof from the high-level re-synchronization window S11 and the re-synchronization window masking S8.

This embodiment is such that when the synchronization signal cannot be detected within the synchronization detecting window S7, the window generating circuit 11 produces the synchronization detecting window S7 in accordance with the synchronization period (sync frame) using as a reference the detection position of the synchronization signal found last. For example, two synchronization detecting windows S7 (the synchronization detecting window S7 generated between times t1 and t2 and between times t2 and t3) generated from time t1 onward are generated in accordance with the synchronization period using time t1 (the last synchronization detection position) as a reference.

Further, in this embodiment, the width of the synchronization detecting window S7 is enlarged by a maximum of ±Pfa whenever the first synchronization detection miss signal S4 is output, in a manner similar to that of the conventional synchronization signal detector described above with reference to FIG. 7. As a result, it is possible to detect synchronization in a case where a synchronization signal cannot be detected owing to burst error due to flaws on an optical disk, random error ascribable to random defects present on the irradiating surface of the light source and disturbance of the synchronization period ascribable to external disturbances.

Furthermore, in this embodiment, by providing a re-synchronization window, detection of the synchronization signal can be performed while erroneous detection of the synchronization signal is suppressed even in a case where the synchronization signal has deviated far from the window owing to a recording shift.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A synchronization signal detecting apparatus, comprising:
    a synchronization detecting circuit for detecting a synchronization signal from an input bit stream in a first window and detecting the synchronization signal from the input bit stream in a second window different from the first window; and
    a control circuit,
    wherein, if the synchronization signal is not detected by said synchronization detecting circuit in the first window in a state in which the second window has been set to a prescribed time interval in a time range that excludes the first window, and the synchronization signal is detected by said synchronization detecting circuit in the second window a predetermined prescribed number of times in succession in accordance with a predetermined synchronization period, said control circuit exercises control for re-synchronization established to generate the first window periodically in accordance with the synchronization period using a detection position of the synchronization signal in the second window as a reference.

2. The apparatus according to claim 1, wherein said control circuit initially sets the time interval of the second window to a time interval that excludes the first window and the neighborhood thereof.

3. The apparatus according to claim 2, wherein, in a case where the synchronization signal has been detected in the second window and not in the first window, said control circuit outputs the second window, which is set to a prescribed length of time, at a position at which a succeeding synchronization signal is expected to be detected, using a detection position of the synchronization signal in the second window as a reference.

4. The apparatus according to claim 3, wherein when re-synchronization has been established, said control circuit resets the time interval of the second window to a time interval that excludes the first window and the neighborhood thereof.

5. The apparatus according to claim 1, wherein said control circuit includes:
    a circuit that, in a case where the synchronization signal is not detected in the first window, is for performing control to enlarge the time interval of the first window by a predetermined prescribed width and outputting the first window of enlarged width at a position at which a succeeding synchronization signal is expected to be detected; and
    a circuit for outputting a synchronization-establishment cancellation signal in a case where the synchronization signal is not detected a predetermined prescribed number of times in succession in accordance with the synchronization period in the first window.

6. An information reproducing apparatus having a synchronization signal detecting apparatus set forth in claim 1 as a synchronization signal detecting apparatus for detecting a synchronization signal from a bit signal stream that has been read cut of an information recording medium.

7. An information recording/reproducing apparatus for writing information to an information recording medium and having a synchronization signal detecting apparatus set forth in claim 1 as a synchronization signal detecting apparatus for detecting a synchronization signal from a bit signal stream that has been read out of the information recording medium.

8. The apparatus according to claim 1, wherein said control circuit comprises a circuit that, in a case where the synchronization signal is not detected in the first window, is for performing control to enlarge the time interval of the first window by a predetermined prescribed width and outputting the first window of enlarged width at a position at which a succeeding synchronization signal is expected to be detected.

9. The apparatus according to claim 1, wherein said control circuit comprises a circuit for outputting a synchronization-establishment cancellation signal in a case where the synchronization signal is not detected a predetermined prescribed number of times in succession in accordance with the synchronization period in the first window.

10. The apparatus according to claim 1, wherein said control circuit comprises a forward protection counter that outputs a count value to be decoded by a decoder, the decoded value being supplied to a window signal generating circuit.

11. The apparatus according to claim 1, wherein said control circuit comprises a re-synchronization counter to count synchronization detections from the synchronization detecting circuit.

12. The apparatus according to claim 1, wherein said control circuit comprises a backward protection counter configured to count the synchronization signal and, if the synchronization signal enters the backward protection counter successively a predetermined number of times for backward protection, then the backward protection counter outputs an overflow signal as a synchronization establishment signal.

13. A synchronization signal detecting apparatus, comprising;
a synchronization detecting circuit for detecting a synchronization signal from an input bit stream in a first window and detecting the synchronization signal from the input bit stream in a second window that is different from the first window;
a circuit for generating the first window and for generating a window mask of a prescribed time interval that includes the first window;
said synchronization detecting circuit comprising a circuit for generating a third window;
a circuit for generating the second window comprising a time interval obtained by excluding the window mask from a time interval of the third window said circuit for generating the third window, when reset, setting the third window so as to extend over the entire interval of the input bit stream; and
said circuit for generating the second window comprising a control circuit,
wherein, if the synchronization signal has been detected by said synchronization detecting circuit in the second window and not in the first window, then said control circuit exercises control for setting the time interval of the second window to a predetermined length of time and generating the second window at a position at which a succeeding synchronization signal is expected to be detected, using a detection position of the synchronization signal in the second window as a reference, and
wherein, if synchronization has been detected a predetermined prescribed number of times in succession in the second window, then said control circuit exercises control for re-synchronization established to generate the first window in accordance with the synchronization period using a detection position of the synchronization signal in the second window as a reference.

14. The apparatus according to claim 13, wherein the circuit for generating the third window is reset when re-synchronization has been established.

15. A synchronization signal detecting apparatus, comprising:
a window generating circuit for generating a synchronization detecting window that defines a first time interval for detecting synchronization, and a re-synchronization window mask of a time interval, the time interval being one of either the same as the synchronization detecting window or that includes the synchronization detecting window;
a re-synchronization window generating circuit for generating a re-synchronization window that defines a second time interval;
a synchronization detecting circuit configured to detect a synchronization signal from an input bit stream in the synchronization detecting window, the synchronization detecting circuit comprising a circuit for generating a re-synchronization detecting window comprising a time interval obtained by excluding the re-synchronization window mask from a time interval of the re-synchronization window, the synchronization detecting circuit further detecting the synchronization signal from the input bit stream in the re-synchronization detecting window; and
a re-synchronization counter for counting synchronization detections in the re-synchronization detecting window by said synchronization detecting circuit,
wherein, if the synchronization signal is detected in the re-synchronization detecting window and not in the synchronization detecting window by said synchronization detecting circuit and said re-synchronization counter counts detection of synchronization in the re-synchronization detecting window a predetermined number of times in succession, said re-synchronization counter outputs a re-synchronization establishment signal,
wherein said window generating circuit receives the re-synchronization establishment signal and generates the synchronization detecting window in accordance with a predetermined synchronization period using a detection position of the synchronization signal in the re-synchronization detecting window as a reference, and
wherein said re-synchronization window generating circuit, receiving the re-synchronization establishment signal, sets the re-synchronization detecting window to a normally activated state.

16. The apparatus according to claim 15, wherein, if the synchronization signal is not detected in the synchronization detecting window in a state in which synchronization has been established, then said window generating circuit enlarges the width of the synchronization detecting window in stages.

17. The apparatus according to claim 15, further comprising:
a backward protection counter for generating a synchronization establishment signal when the backward protection counter counts detection of the synchronization signal in the synchronization detecting window of said synchronization detecting circuit a prescribed number of times in succession; and a forward protection counter for outputting a synchronization cancellation signal when the forward protection counter counts a synchronization miss in the synchronization detecting window in said synchronization detecting circuit a prescribed number of times in succession in a state of synchronization establishment.

18. The apparatus according to claim 17, wherein said backward protection counter is reset by receiving the synchronization cancellation signal from said forward protection counter and the synchronization miss in the synchronization detecting window in said synchronization detecting circuit, and wherein said forward protection counter is reset by receiving detection of the synchronization signal in the synchronization detecting window of said synchronization detecting circuit and the re-synchronization establishment signal from said re-synchronization counter.

19. A method of detecting a synchronization signal in a window from an input bit stream, said input bit stream allowing for synchronization of data read from an optical disk, said method comprising:

generating first and second windows that define time intervals for detecting a synchronization signal, and setting the second window to a prescribed time interval of a time range from which the first window has been excluded; and if the synchronization signal is detected a predetermined prescribed number of times in succession in the second window in accordance with a predetermined synchronization period without being detected in the first window, generating the first window in accordance with the synchronization period using a detection position of the synchronization signal in the second window as a reference to thereby synchronize the reading of data from the optical disk.

20. The method of claim 19, further comprising creating the first synchronization window and second synchronization window at each said synchronization period.

* * * * *